United States Patent Office 3,174,901
Patented Mar. 23, 1965

3,174,901
PROCESS FOR THE ORAL TREATMENT
OF DIABETES
Jean J. Sterne, Suresnes, France, assignor to Jan Marcel
Didier Aron-Samuel, Suresnes, France
No Drawing. Filed Jan. 31, 1963, Ser. No. 255,191
2 Claims. (Cl. 167—65)

This is a continuation-in-part of U.S. application Serial No. 735,105, filed on May 14, 1958, which in turn is a continuation-in-part of U.S. application Serial No. 697,546, filed on November 20, 1957, both now abandoned.

The present invention relates to a novel method of treating diabetes by oral administration as well as to the pharmaceutical compositions useful therefor.

The composition to be administered orally according to the present invention contains as active ingredient a dimethyl biguanide corresponding to the following formula

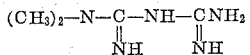

In a preferred embodiment, the dimethyl biguanide according to this invention is used in the form of its acid addition salts, primarily the hydrochloride, having the formula

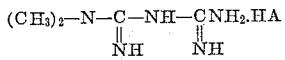

in which A is the anion of a non-toxic acid.

While the preferred salt is the hydrochloride corresponding to the above structure when A represents a chloro atom, the acid addition salt with any nontoxic, stable, pharmaceutically acceptable acid may be used, such as the following salts; the phosphate, sulfate, hydrobromide, salicylate, maleate, benzoate, succinate, ethanedisulfonate, fumarate or glycolate.

The classic means for controlling blood sugar and urine sugar in diabetics has been by injection of insulin. This method, although effective pharmacologically, has its obvious drawbacks since it requires that the material be injected by means of a hypodermic syringe.

Treatment by syringe has obvious drawbacks. Moreover the lowering of sugar content by insulin injections may produce hypoglycemic coma.

Another treatment has been by sulphonylureas taken orally. However, this composition has limited fields of use and many diabetics fail to respond to it.

Dimethyl biguanide has been experimented on animals. In 1929 Hesse and Taubmann have found that the product could have a hypoglycemic action but that the dosages susceptible of reducing the blood sugar content were highly toxic. As a consequence they advised against any use of this product as an antidiabetic for human beings.

Another experimentor (Eusebio Y. Garcia) has attempted to use dimethyl biguanide as an analgesic and anti-flu drug. The dosages were of approximately 65 mg. by injection during a maximum period of two days.

The real problem of treating diabetes does not exclusively reside in the lowering of the sugar in the blood of any individuals. This can be done by many different compounds. But to control diabetes such an action must be exerted on diabetic individuals without any harmful action such as toxicity, lowering of the sugar content to the minimum physiological limit having as a consequence the hypoglycemic coma, etc. The ideal treatment will have to keep the sugar content as close as possible to the normal physiological range. This is the problem which has been solved by this present invention.

It has been observed that certain critical dosage limits permit a favorable hypoglycemic action on diabetic individuals in reducing the abnormal sugar content without being toxic and without decreasing the blood-sugar content to a dangerous limit to the point approaching the hypoclycemic coma.

It has also been observed that these critical range dosages exert no hypoglycemic action on normal human beings.

A normal daily regimen of the antidiabetic composition according to the invention, containing as an active ingredient dimethyl biguanide hydrochloride for oral administration, is from about 1–4 grams as an initial dosage per diem, which is then adjusted to a maintenance dosage, substantially in the said limits or at a lower dosage.

For children the dosages will have to be reduced according to age groups in a manner which is known in medical art.

As mentioned above, the novel drug is also very useful in such cases of diabetes in which preparations hitherto used for oral administration proved ineffective. One of these cases is for example oscillating diabetes.

The dimethyl biguanide constituent of the composition is prepared as follows:

Five hundred grams of cyanoguanide are melted with 475 g. of dimethylamine hydrochloride in a suitable vessel provided with an agitator and with a thermometer in an oil bath. The progressive melting is practically accomplished at about 120–130° C. The mixture is maintained for about three hours at about 135° C. and should not be overheated.

After this heating, this mixture is placed in boiling water and left for crystallization. This latter crystallization may be executed from alcohol.

The obtained crystals consist of pure dimethyl biguanide hydrochloride. The base is obtained by treatment with alkali. Other salts may be prepared by reacting the base with one equivalent or more of the acid in a suitable organic solvent such as ethanol or methanol. Alternatively, other salts are prepared by a double decomposition reaction of the soluble hydrochloride salt.

The exact assay of the product in aqueous or organic solutions is determined by the colorimetric system due to the reaction known as the Sakaguchi reaction proper to the guanidic group. The coloration of the guanide derivatives when operating at 0° and in a glycero-alcoholic medium is stable and can be measured by electrophotometric means.

In order to avoid any possible ambiguity, herebelow is a method of assaying this product.

The following four reagents are prepared:

(a) A solution of 1.0 g. of α naphtol in 100 cc. of alcohol at 95° C., this solution constituting a basic reagent to be diluted to ⅕ in distilled water when it is to be used;

(b) A solution of sodium hydroxide at 40%;

(c) A solution of sodium hypobromide obtained by the addition of 0.9 cc. of bromium to 100 cc. of a solution of sodium hydroxide at 40%;

(d) An aqueous solution of urea at 40 gr. per 100 cc.

When used, all the reagents are cooled at 0° C., for instance by means of an ice bath.

To execute the assay operation, a certain amount, for instance 50 to 400 g. of the guanide derivative contained in a fixed volume of 2 cc. is introduced into a tube. An amount of 0.25 cc. of the sodium hydroxide solution at 40% and 0.1 cc. of the solution of α naphthol upon dilution to ⅕ from the beforehand prepared solution is introduced thereafter. The mixture is agitated and the tube is allowed to stand during 15 minutes at the same temperature of 0° C. An amount of 0.5 cc. of the solution of sodium hypobromide is then added also under agitation. The coloration attains its maximum intensity after 30 seconds. Immediately thereafter 10 cc. of alcohol at 95° C. and 1 cc. of the solution of urea at a concentration of 40 g. per 100 cc. are added. This new mixture is once again agitated and its contents poured into a vessel having a wall thickness of 1 cm. and adapted for the photocolorimetric method of Boney Maury executed with a green filter having a wave length of about 535 m$\mu$.

Another tube is prepared in the same conditions but the guanide derivative is replaced by 2 cc. of distilled water. The difference between the optic densities of those two preparations gives the final result.

A normal daily maintenance regimen of the antidiabetic composition of this invention containing dimethyl biguanide hydrochloride for treating a human being is advantageously about 3.0 g. of the active ingredient corresponding, approximately to 15–20 mg./kg., when administered orally. Sometimes, 1.0 g. daily or even less is quite sufficient. Occasionally, doses amounting to 5.0 g. a day can be administered without untoward effects.

In general, the initial daily dosage regimen of this composition for beneficial antidiabetic effect can vary from about 1.0 g. to about 5.0 g. of active ingredient administered orally, usually in 3 or 4 divided doses. After this, maintenance treatment has to be continued.

The principle of this method of treatment of diabetes, in human beings, consists of rather high dosage of the active biguanide ingredient to lower the initial high sugar levels of the blood to normal as described hereabove. The maintenance doses may be at ranges lower than those initially required and are best determined by the attending physician who must take into account the case file of the patient.

No toxic effects whatsoever are observed interfering with the use of the new preparation of this invention even at the initial elevated doses.

Moreover, it has been observed that, the hereabove contemplated dosage regimens only affected the high sugar contents, i.e., those lying over the normal limit. In other words, these dosages are only effective with diabetic individuals. In these conditions hypoglycemic comas do not occur.

The compositions of this invention are dosage units comprised of from about 10 mg. to 1.0 g. of dimethyl biguanide or a salt thereof with a nontoxic acid and a pharmaceutical carrier or filler. The pharmaceutical filler may be, for example, a solid. Examples of the preferred solid carriers are talc, lactose, corn starch, ethyl cellulose, magnesium stearate, agar pectin, stearic acid, gelatin or acacia. Examples of liquid carriers are water, peanut oil, olive oil, and sesame oil. The amount of carrier may vary widely but will usually be from about 10 mg. to about 1.0 g. per unit dosage.

Preferable and advantageous dosage unit compositions are comprised of from about 250 mg. to about 750 mg. of dimethyl biguanide and a pharmaceutical carrier, preferably solid.

The compositions of this invention containing as active ingredient a dimethyl biguanide can be prepared in various pharmaceutical forms, such as tablets, pills, powders, troches, capsules, granules, solutions, etc. The granules or tablets can be covered if necessary by sugar, wax, lacquer, fat, shellac coatings or the like.

The best dose in the case of a tablet, capsule or pill is considered as being of about 500 mg., but it is obvious that this dose can vary as discussed above. The upper limit of active ingredient is limited only by the size of the final dosage unit.

The ingredients of the composition can be mixed in proper proportion and filled into hard or soft gelatin capsules. Alternatively, the components can be mixed, granulated with suitable lubricants and tableted. Conventional or sustained release tablets can be prepared by methods known to the formulation art.

Example 1

Dimethyl biguanide, 0.50 g., corresponding approximately to 80–90% and preferably 83% in weight.

Bicarbonate of sodium 0.085 g., corresponding approximately to 10–15%, preferably 14% in weight.

Stearate of magnesia 0.015 g. corresponding approximately to 2–5%, preferably 3% in weight.

The ingredients are mixed and filled into hard gelatin capsules.

Example 2

Dimethyl biguanide hydrochloride, about 0.50 g.
Sodium bicarbonate, about 0.072 g.
Arabic gum, about 0.04 g.
Stearate of magnesia, about 0.015 g.
A cementitious substance, for instance that known on the market under the trade name Rhodopas, about 0.012 g.

The ingredients are mixed, granulated and tableted on a standard tableting machine.

Example 3

Dimethyl biguanide hydrochloride, 0.10 g.
Lactose, 0.15 g.

The ingredients are mixed and filled into a hard gelatin capsule.

Example 4

Dimethyl biguanide, 0.60 g.
Talc, 0.025 g.

The ingredients are mixed and filled into a hard gelatin capsule.

To illustrate the above explanations, a limited number of clinical results will be given herebelow.

(1) A woman of 62, diabetic for 23 years. Fasting blood sugar varying between 180 and 300 mg.—Daily glycosuria was approximately 30 g./24 hrs.—Allergic to any other kind of antidiabetics.

The administration of the product of this invention at a daily dosage regimen varying after the initial treatment between .50 and 1.0 g. reduced the blood sugar to 100–130 mg.—Glycosuria disappeared completely. No allergy has been observed with dimethylbiguanide.

(2) A man of 54, diabetic for 10 years. Blood sugar of about 334 mg. Glycosuria of about 80 g. per 24 hours.

The administration of the product of this invention at a daily regimen of 3 g. gave the following results:
After 8 days: blood sugar 175 mg. Glycosuria—0
After 3 weeks: blood sugar 145 mg. Glycosuria—0
After 5 weeks: blood sugar 140 mg. Glycosuria—0

(3) A man of 50. Blood sugar of about 172 mg. and glycosuria of about 71 g. per 24 hours.

After an initial treatment with the product of this invention administered at a daily regimen of 1.25 g. per 24 hours:
After 8 days: blood sugar 140 mg. Glycosuria—0
After 15 days: blood sugar 115 mg. Glycosuria—0
After this initial treatment, a maintenance treat is used at a daily dosage regimen of .75 g. per 24 hours.
After one month: blood sugar 120 mg.
After 3 months: blood sugar 95 mg.

What I claim is:

1. A method of continuously treating diabetes of human beings which comprises orally administering initially a daily dosage regimen of about 1 to 4 grams of a compound selected from the class consisting of

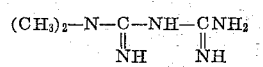

and its non-toxic acid addition salts, and thereafter orally administering a daily adjusted maintenance dose of said compound.

2. The method according to claim 1 wherein said compound is dimethyl biguanide hydrochloride.

References Cited by the Examiner

Chemical Abstracts 45: 4348(d), 1951.
Chemical Abstracts 23: 4930–4932, 1929.
Chemical Abstracts 24, 2181–2182, 1930.
Chemical Abstracts 44: 6032(g), 1950.
Chemical Abstracts 49: 14186(c), 1955.
Chemical Abstracts 48: 13058(i), 13059(a), 1954.

LEWIS GOTTS, *Primary Examiner.*

IRVING MARCUS, *Examiner.*